United States Patent [19]

Lahti

[11] Patent Number: 4,536,872
[45] Date of Patent: Aug. 20, 1985

[54] TELECOMMUNICATION SYSTEM FOR TRANSMITTING DATA INFORMATION BY MEANS OF A DIGITAL EXCHANGE

[75] Inventor: Mauritz J. B. Lahti, Huddinge, Sweden

[73] Assignee: Telefonaktiebolaget LM Ericsson, Stockholm, Sweden

[21] Appl. No.: 552,045

[22] PCT Filed: Feb. 21, 1983

[86] PCT No.: PCT/SE83/00055
§ 371 Date: Oct. 13, 1983
§ 102(e) Date: Oct. 13, 1983

[87] PCT Pub. No.: WO83/03036
PCT Pub. Date: Sep. 1, 1983

[30] Foreign Application Priority Data

Feb. 24, 1982 [SE] Sweden ............................. 8201154

[51] Int. Cl.$^3$ ............................................. H04J 3/16
[52] U.S. Cl. ......................................... 370/82; 370/84
[58] Field of Search ................................... 370/84, 82

[56] References Cited

U.S. PATENT DOCUMENTS 3,796,835  3/1974  Closs et al. ............................. 370/84
4,392,234  7/1983  Maruta ................................... 370/84
4,471,480  9/1984  Haussmann et al. .................... 370/84

FOREIGN PATENT DOCUMENTS 2024565  1/1980  United Kingdom .

Primary Examiner—Douglas W. Olms
Assistant Examiner—Kenneth I. Rokoff
Attorney, Agent, or Firm—Roberts, Spiecens & Cohen

[57] ABSTRACT

A telecommunication system for utilizing a telecommunication exchange intended for transmitting digital information between a plurality of extensions for transmitting between data terminals data information having different rates. Word forming means (18, 19) at the extensions subdivide the data flow into words of given length, buffer means (24) store a plurality of words before sending these out over the line, which is done with the bit rate given by the transmission system for digital information, and frame forming means (30) form frame heading words which precede the frames and have a plurality of subsequent data words. The frame heading word includes a frame locking word for synchronization on the receive side and a frame length word for indicating the number of the subsequent data words. Counting means (29) count the number of words in the buffer means and a control logic (34) controls transmission of data words and the frame heading word such that as soon as the heading word with information on the number of data words has been transmitted there follows transmission of the data words from the buffer means, while the frame heading word by itself is transmitted continuously if the buffer means is empty. On receiving the data signals, a comparison takes place between the incoming binary flow and the frame locking word in a frame locking means (35, 36, 37) for determining the beginning of the frames, the data words are separated from the frame heading word with the aid of filter means (39, 40, 41) and the received data words are stored in buffer means (56) for subsequent output in series form to the data terminal.

3 Claims, 4 Drawing Figures

Fig. 1
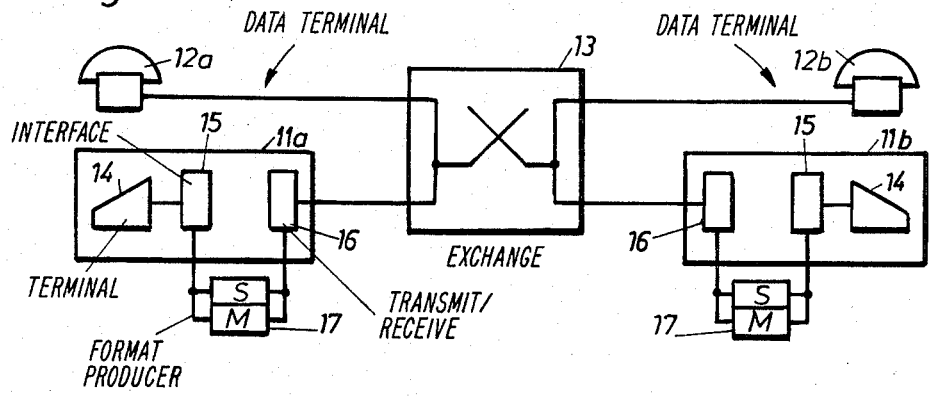
Fig. 4
a) 48 kbit/s
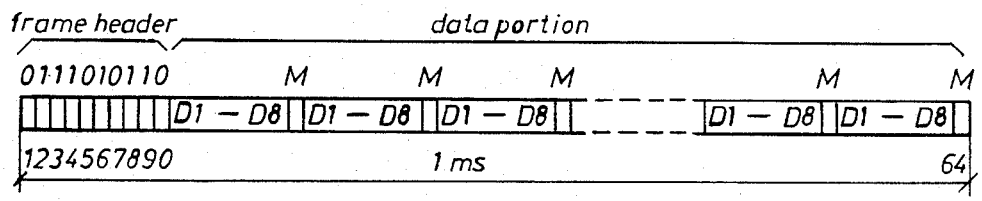
b) 9,6 kbit/s
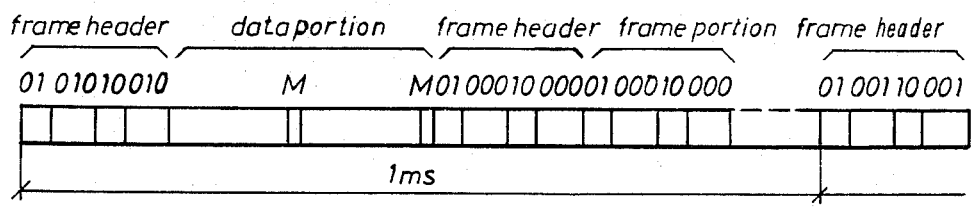

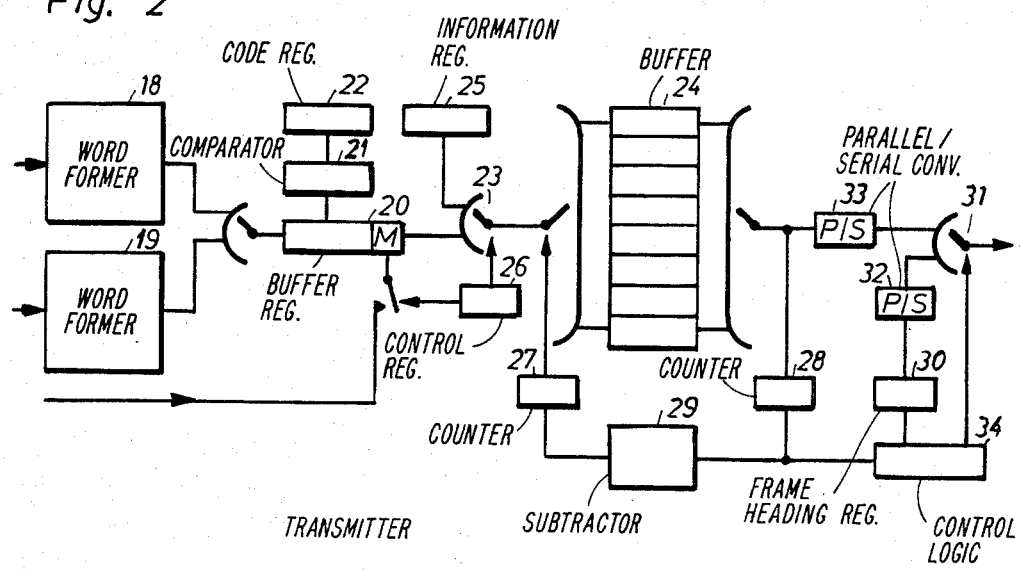
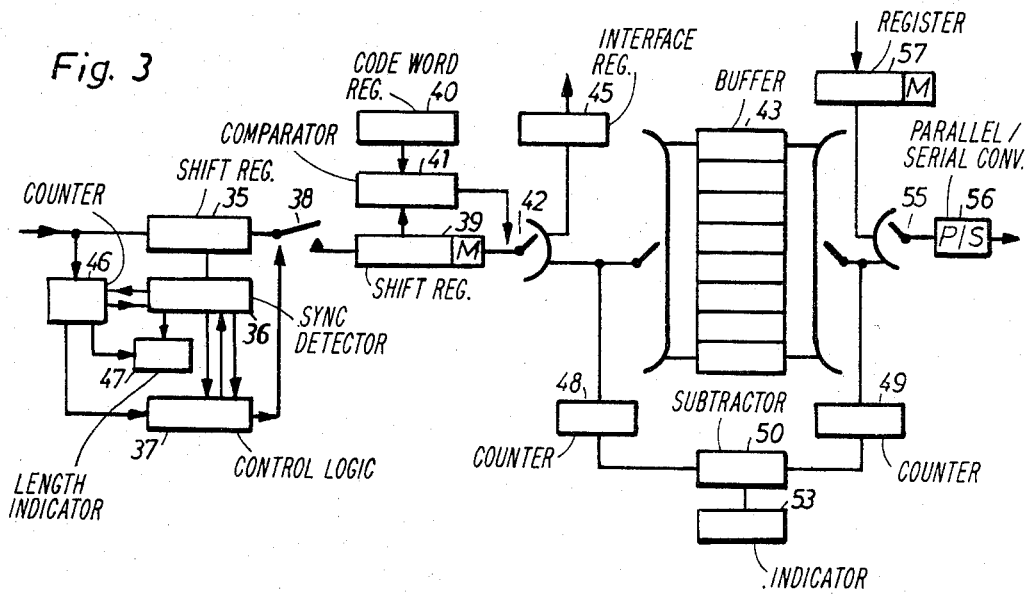

TELECOMMUNICATION SYSTEM FOR TRANSMITTING DATA INFORMATION BY MEANS OF A DIGITAL EXCHANGE

TECHNICAL FIELD

The present invention relates to a telecommunication system having telecommunication exchanges, wherein digital information is transmitting between a plurality of exchanges, different transmission rates.

BACKGROUND ART

It is already known to utilize digital transmission channels, intended for example for telephony and operating with pulse code modulation, for transmitting data information, not only if the bit rate in the data information consists of pure submulitples of the PCM channel, i.e. 64 kbits/s, but also for the data rates standardized by CCITT. Such a modulation will be apparent from the Swedish Pat. No. 376 137, describing an example of the transmission of data information at 2.4 kbits/s on a standard 64 kbits/s voice transmission channel.

DISCLOSURE OF INVENTION

These known arrangements do not, however, solve the problem of being able to transmit desired arbitrary standard data rates without considerable alteration in terminal equipment, while at the same time being able to use the same exchange for setting up speech connections as well as for setting up the data channels with different data transmission rates. Furthermore, they do not enable transmission over the same line of several data flows having different-speeds, nor synchronous and asynchronous data flow mixed with each other.

The basic concept of the invention is that each of the transmitting terminal equipments produces a data format corresponding the intended data rate, this format being forwarded by the exchange without the latter even having knowledge of whether data signals or voice signals are passing through a set-up connection.

The invention is characterized as will be seen from the claim.

DESCRIPTION OF FIGURES

The invention will be described in detail below, with reference to the appended drawing, on which FIG. 1 illustrates a telecommunication system in accordance with the invention, FIG. 2 illustrates the transmitter part of a terminal equipment, FIG. 3 illustrates the receiver part of a terminal equipment, and FIGS. 4a, 4b illustrates examples of different formats used in transmitting at different data rates.

PREFERRED EMBODIMENT

FIG. 1 schematically illustrates a telecommunication system, in accordance with the invention, represented by two data terminal equipments 11a and 11b connected to an exchange 13, intended for setting up digital voice connections between two telephone extensions, e.g. 12a, 12b. The exchange is a conventional digital exchange forwarding telephone calls in accordance with the PCM principle over 64 kbits/s channels between 30 extensions, for example. Such an exchange is well known, and is described in the Swedish Pat. No. 351 541, for example, and therefore it will not be described any further here.

The data terminal equipment includes the conventional components, the terminal 14, an interface adjusting circuit 15 and a transmitter-receiver circuit 16, and a data format-producing circuit 17 in accordance with the invention being connected between circuits 15 and 16. In its transmitter part S, the data format-producing circuit 17 converts the data flow coming from the data terminal to a-format which can be transmitted with the aid of the available 64 kbits/s channel, and in its receiver part M it can restore the original data flow.

The basic inventive concept is that the data flow is subdivided into binary words of given length which are then transmitted at the bit rate of the PCM channel but with the number per time unit made necessary by the data rate. A bit rate of 64 kbits/s enables, for example, a CCITT standard data transmission rate of 48 kbits/s, further bit information being transmitted for synchronization and interface information, as will be described later on. If there is a 16 kbits/s channel available in addition to the 64 kbits/s channel over the line, a higher data rate (56 kbits/s) than the one mentioned above can be transmitted, however.

FIG. 4a illustrates how a frame for transmission of a 48 kbits/s data flow is built up. The frame is subdivided into a frame heading part and a data part having 8-bit data words. The frame heading contains a frame locking word in the bit positions 1 and 2, and six and seven, e.g. 01, 10 and a frame length word in the positions 3-5 and 8-10, for indicating the number of data words following after the frame heading. The data words are provided with a ninth bit, the modifying bit, denoting that the word contains data information or information concerning the interface. In addition to the heading, words with the latter imformation will be separated from the data flow on reception. With a frame heading 10 bits long and 6 data words 9 bits long, the 64 kbits/s channel will be exactly sufficient to transmit a 48 kbits/s data flow. It should be noted that transmission of interface information is enabled without the speed being limited, if longer frames are used, e.g. comprising 8 or 9 words, in which case the capacity which is liberated by fewer frame heading words can be utilized. In transmitting asynchronous characters, the data words may contain fewer bits, e.g. 7 bits. This is possible since, in accordance with the invention, the start and stop bits can be removed on transmission, as will be described later on, and the asynchronous words can be placed with the correct characters in the frame. The start and stop bits are then added on the receiver side when transmitting the words in serial form.

If the data rate is low, e.g. 9.6 kbits/s (cf FIG. 4b) alternating 1 and 2 data words of 8 bits are required to transmit 9.6 bits during 1 ms. When a data word has been read out and transmitted, it is necessary to wait for the transmission of the next data word until at least 8 bits have come in. As long as 8 bits have not come in, only the frame heading including the frame length word 0 is transmitted, the frame length word 0 denoting that a data word does not follow after the frame heading. Immediately thereafter comes the next frame heading containing the frame length word 0 until at least 8 bits have been stored, so that a frame heading can be transmitted with the information that a data word follows. During a number of sequential 1 ms periods the frame heading will consequently be transmitted followed alternatingly by 1 and 2 data words (during 5 periods there follows 1 word and during 1 period there follows 2 words) while the remaining space is filled with frame headings denoting 0 frame length closely after each other. This will be seen from FIG. 4b and from FIG. 2a, showing how the format is produced in the transmitter.

FIG. 2 schematically illustrates the transmitter part in a data format circuit 17, which can receive synchronous as well as asynchronous data flows. Conventional circuits denoted by 18 and 19 subdivide the incoming synchronous and asynchronous data flow into 8-bit words, after the start and stop characters have been removed from the latter, and feed these to a buffer register 20. The contents of the buffer register is compared in a comparator 21 with the contents in a code register 22, in which a start word is recorded, and when there is agreement the buffer register 20 receives an energizing signal such that its contents supplemented by a ninth bit, a modifying bit, is fed via a switch 23 to a buffer 24. The purpose of the modifying bit is to enable separation of information words associated with the normal data flow from such information words as are necessary for transmitting information concerning the interface state to the receiver side. These values are stored in an interface information register 25 and are fed through the switch 23 to the buffer when the switch is set by a control register 26, which also provides for feeding to the register 20 of the modifying bit from a control unit (not shown).

The buffer is a memory for storing a plurality of 9-bit words which are fed out according to the first-in-first-out principle. Two counters 27, 28 count the number of fed-in or fed-out bits and a subtraction circuit 29 continously calculates the difference between these two values. This difference will define the number of words included in a frame and which is indicated in the frame heading. A frame heading register denoted by 30, has its contents read out at the beginning of each frame, and which contains a permanently recorded frame locking word as well as space for frame length or word number bits. In the example, the bit positions 1, 2, and 6, 7 are intended for the frame locking word enabling recognition of the start of a frame, and the bit positions 3–5 and 8–10 denote the number of data words in the frame, e.g. 110, if there are 6 words to be read out from the buffer after terminating a frame occuring most often at a data rate of 48 kbits/s and, e.g. alternating 1 and 0 at a rate of 9.6 kbits/s (cf FIGS. 4a and 4b).

A switch denoted by 31 may be switched between the output of the buffer 24 and the output of the frame heading register 30. As soon as the information contents of the buffer corresponds to at least one word, a control logic 34 records this number in the frame heading register and resets the switch 31 to feed its contents via a parallel-series converter 32 to the line, the subtracting circuit 29 subsequently being set to zero. When the frame heading word has been fed out, the switch is reset to the input of the buffer and its contents is fed word by word over a parallel-series converter 33 to the line via the transmitter-receiver circuit 16. If the contents of the buffer 24 has been fed out to the line and the subtracting circuit value still corresponds to 0 words, the frame heading word with the word number information 0 is fed out immediately after the last word in the preceding frame by the switch 31 being changed over reset. This is repeated until the number of stored words in the buffer 24 is at least one, subsequent to which a frame heading with following data words is transmitted. It is obvious that from the point of view of the described process it has no importance whether the incoming data flow is synchronous or asynchronous, what rate the data flow has or the form of the asynchronous characters.

FIG. 3 illustrates the receiver part in the format converting circuit 17. The incoming data flow is fed to a 10-bit shift register 35 in a device for synchronizing and determining the frame length. The frame heading word contains the synchronization word, e.g. 0100, in its bit positions 1, 2 and 6, 7 and the same synchronization word is recorded in a synchronization word detector 36. Before synchronization has taken place, each bit in the shift register is compared with each bit in the synchronization detector. This is performed with the aid of a control logic 37 which closes a contact 38 as soon as synchronism has been obtained, so that the word following after the frame heading in the frame can be fed to a shift register 39. The contents of the shift register 39 is compared with the contents of a code word register 40 with the aid of a comparison circuit 41, to determine whether the data flow contains interface information. If this is not the case, the shift register is connected by a switch 42 to a buffer 43 which can store a plurality of 8-bit words, which have already been stripped of their modifying bit in the shift register 39. As an alternative, it is just as possible for the words to be stripped of the ninth bit after first being fed in from the buffer 43. This has no importance in respect of the invention, however. The buffer 43 is of the first-in first-out type, in the same way as the buffer 24 on the transmitter side. The switch 42 is controlled by the comparison circuit 41 such that when the modifying bit indicates that the data word contains interface information, the data word is fed to an interface register 45, from which it is read by a control unit for obtaining control information for the receiver equipment. If synchronism has been obtained with the receiver equipment, there is no need to check the frame heading for every bit period but solely after each frame. A counter denoted by 46 counts the number of bits coming in after each frame heading, and a length indicator denoted by 47 obtains information in respect of frame length due to the information recorded in the frame header from the synchronization word detector 36, e.g. 54 bits. Only when the counter 46 has counted to this value is the synchronization word detector 36 energized by the control logic 37 to make a new comparison with the incoming data flow. The buffer 43 is provided with two counters, one on the input side 48 and one on the output side 49. Their contents is fed to a subtracting circuit 50 for determining the difference, which is then read by an indicator 53 so that the readout speed can be increased or decreased in response to the buffer content exceeding or falling below given limited values, and overflow and underflow are avoided. The data words from the buffer 43 are fed via a switch 55 and a parallel-series converter 56 to the data terminal 14 via the interface adjustment circuit 15 (FIG. 1). Information intended for the receiver terminal can be written into a register 57 by the format circuit control unit for sending further to the receiver terminal after changing over the switch 55. The invention enables, for example, a digital exchange for voice transmission and a voice channel with a speed of 64 kbits/s to be utilized for transmitting data flows having arbitrary speeds under a given limit without any modification of the exchange itself. Only the described supplementary equipment between the data terminal and the line is necessary.

Further advantages of the apparatus in accordance with the invention are that it enables multiplexing, i.e. transmission of several data flows on the same transmission channel, as well as transmission of synchronous and asynchronous data flows mixed with each other.

I claim:

1. In a telecommunication system including a telecommunication exchange for handling digital information and at least two data terminals, apparatus for transmitting data information between the data terminals via the telecommunication exchange comprising:

first means for connecting one of the two data terminals to the telecommunication exchange, said first means comprising at least, word forming means connected to the data terminal for subdividing the data flow into data words of given length, buffer means for storing a variable plurality of the words of given length received from said word forming means, frame forming means for generating a heading word for a frame, said heading wording including a frame locking word for synchronization and a frame length word for indicating the number of data words in a frame, counting means for counting the number of data words in said buffer means, transmission means for transmitting frames of words to the telecommunication exchange, and control means for controlling the switching of words from said frame forming means and from said buffer means to said transmission means, said control means further controlling the insertion of the count of the data words counted by said counting measn into the heading word prior to the transmission thereof; and second means of connecting the other of the two data terminals to the telecommunication exchange, said second means comprising at least, receiver means connected to said telecommunication exchange for receiving frames of words, frame locking means for determining the beginning of frames by locating heading words in the received frames, filter means responsive to said receiver means and said frame locking means for separating the data words of the frames from the heading words, and forwarding means for sending the separated data words to said other data terminal.

2. The apparatus of claim 1 wherein said frame locking means comprises means for comparing the received words of the frame with a stored given word.

3. The apparatus of claim 1 wherein said forwarding means comprises buffer means for storing the data words received from said filter means, and means for transmitting the data words in said buffer means serially to said data terminal.

* * * * *